Patented July 4, 1933

1,916,403

UNITED STATES PATENT OFFICE

FREDERICK C. ATKINSON, OF INDIANAPOLIS, INDIANA, ASSIGNOR TO JOHN G. PRAED

TOOTH PASTE

No Drawing.   Application filed November 11, 1931.   Serial No. 574,366

The object of the present invention is to provide a dentifrice, preferably in the form of a paste, which shall be unusually beneficial to the teeth and gums of the user because of the nutritional, stimulating, toughening, or bleaching value of certain of the constituents of the dentifrice. More particularly, it is an object of the invention to provide a dentifrice which shall contain natural substances having a tendency not only to bleach the teeth, but which also has other beneficial effects upon the teeth and gums of the user. A further object of the invention is to provide a dentifrice containing natural substances extracted from citrus fruits, the extract including those constituents of the fruits which have a bleaching effect, and including also the stimulating and toughening constituents and the nutritional vitamin-carrying constituents of the fruits. A still further object of the invention is to provide a dentifrice containing a mineral polishing agent and an essential oil of citrus fruit of such character as not to be attacked by the polishing agent or by any other component of the mixture. Further objects of the invention will appear as the description proceeds.

To the accomplishment of the above and related objects, my invention may be embodied in the form described in the following specification, attention being called to the fact, however, that the specific embodiment described is by way of illustration only and that changes may be made therein, so long as the scope of the appended claims is not violated.

It is recognized by nutritional experts that the citrus fruits contain much of dietetic value in the way of mineral and accessory food substances, among which, vitamins A, B, and C are outstanding elements. Although the materials of a dentifrice do not enter the alimentary tract to any considerable extent, yet these materials come into intimate contact with the gums and the other highly absorptive tissues of the oral cavity during the brushing and massaging produced in the normal process of cleansing the teeth. I have found that, if the mineral and organic food substances which are present in citrus fruits are added to a dentifrice, they are absorbed to quite an appreciable extent by the gums and other absorptive tissues of the mouth, and that they are highly beneficial in maintaining and promoting a healthy condition of the gums and teeth. It is also recognized that citrus fruits include constituents having bleaching tendencies, and I have found that, if those constituents are included in a dentifrice, the bleaching effect of the dentifrice on the teeth is materially improved. Furthermore, certain components of citrus fruits have, when introduced into a dentifrice, a decidedly beneficial effect in stimulating and toughening the gums of the user.

The essential oils of citrus fruits constitute a desirable constituent of a dentifrice primarily for the reason that they impart a pleasant flavor and odor to the product, and these add materially to the marketability of the product.

It is obvious, from the above, that a dentifrice containing all of the desirable constituents of a citrus fruit will have many highly beneficial characteristics. I shall describe my invention as applied to a dentifrice of the paste type, but it is to be understood that I do not intend to limit myself to this form of dentifrice, since my invention may be applied also to other forms of dentifrice.

Substantially all paste type dentifrices include a comminuted polishing agent, which practically always takes the form of a sparingly soluble salt of calcium or magnesium; a binder, which is preferably a pasty soap; and such other more or less inessential constituents as may be desired, such as glycerine, water, antiseptics, and the like. It has been found that the natural essential oils of citrus fruits are attacked by calcium or magnesium salts, when brought into intimate contact with such compounds, with the result that a relatively rapid reaction takes place which develops in the mixture a definitely rancid odor and flavor. I have discovered that this reaction, resulting in the above-mentioned rancidity, takes place between the calcium or magnesium compounds and the terpenes which are present in the natural essential oils of citrus fruits.

A series of careful tests has shown that, if substantially all of the terpenes are removed from the natural essential citrus oils before those oils are mixed with the polishing agents of the dentifrice, the above-mentioned reaction does not take place, and the tendency toward rancidity is substantially eliminated. While I believe that the removal of substantially all of the terpenes from the fruit extract will entirely prevent the development of rancidity in the dentifrice, my experiments are of such late date that I am not prepared to say that this tendency is completely eliminated. I can state definitely, however, that the tendency is so materially reduced that the reaction is at least sufficiently retarded to make the resulting dentifrice a commercially practical product, since rancidity does not develop over a period of several months.

Of course, it would be possible to provide a dentifrice having the flavor and odor of a citrus fruit without encountering the problem of the development of rancidity, by using synthetic citrus flavors. I do not consider my invention to include this expedient, however, since such a procedure would not result in a dentifrice having the advantageous properties of the dentifrice of my invention. An essential feature of my invention is the provision of a dentifrice which is not only provided with the flavor and odor of citrus fruit, but which likewise carries the nutritional, stimulating, and/or bleaching values of the citrus fruit.

I have found that complete elimination of the terpenes from the natural oils is not essential, but that a citrus oil from which approximately 90 percent of the terpenes originally present have been removed will accomplish the functions of my invention.

I have found that the natural coloring matters of citrus fruits, and particularly the tannic acid associated therewith, are beneficial to the teeth and gums. The tannic acid has a decided tendency not only to stimulate the gums, but also to toughen them, thereby protecting them against injury from the desirably stiff bristles of a tooth brush, and guarding them against those infections which so often result from slight lacerations.

I prefer to extract these substances from the rinds of the fruit by means of solvents. Such process of extraction results in a mixture of the coloring matters and the tannic acid with a considerable proportion of the flavoring matter of the fruit; so that the addition of the extracted substance to the dentifrice imparts not only a stimulating and toughening tendency to the dentifrice but also a desirable natural fruity flavor and color to the same.

A large proportion of the nutritional values of the fruit, including most of the vitamin-carrying constituents thereof, are found in the normally edible portions of the fruits. These portions are very rich in potassium citrate, potassium phosphate, sodium phosphate, aluminium, calcium, magnesium, silica, oxides of sulphur, and minute quantities of chlorine and manganese. I incorporate all of these substances in my dentifrice, in more or less readily soluble form, and I consider the same to be an important feature of my invention.

While, in its most beneficial form, my invention consists in the addition to a dentifrice of all of the mineral and readily soluble organic substances of citrus fruit, some advantages may be attained by the inclusion in the dentifrice of the terpeneless essential oils of the fruit, alone, and I consider my invention to be broad enough to include a dentifrice containing only those constituents of the fruit which are included in the terpeneless essential oil.

In the commercial practice of my invention, I find it necessary to add small quantities of coloring matter in order to maintain uniformity of color in the product, since the natural colors of citrus fruits vary over a wide range.

I claim as my invention:

1. A dentifrice comprising a paste including a polishing agent which normally reacts with terpenes, a natural oil of citrus fruit, and a binder, the natural terpenes having been substantially eliminated from the oil.

2. A dentifrice comprising a sparingly soluble magnesium compound polishing agent, a natural extract of citrus fruit including an essential oil thereof, and a binder, said extract being substantially free of terpenes.

3. A dentifrice comprising a sparingly soluble calcium compound polishing agent which normally reacts with terpenes, a natural extract of citrus fruit including an essential oil thereof, and a binder, said extract being substantially free of terpenes.

4. A dentifrice comprising a paste including a binder, a polishing agent which normally reacts with terpenes, and an extract of citrus fruit, said extract including substantially all of the natural oils, and minerals of the fresh fruit, but being substantially free of terpenes.

5. A dentifrice comprising a soapy binder holding in the form of a paste a mixture of a finely divided calcium compound polishing agent, and an extract of citrus fruit containing substantially all of the constituents of the fresh fruit including the rind, but substantially free of terpenes.

6. A dentifrice comprising a soapy binder holding in the form of a paste a mixture of a finely divided magnesium compound polishing agent, and an extract of citrus fruit containing substantially all of the constituents of the fresh fruit including the rind, but substantially free of terpenes.

7. A dentifrice comprising a pasty binder holding in the form of a paste a finely divided mineral polishing agent with which is mixed an extract including substantially all of the soluble constituents of a citrus fruit, those fruit constituents which are subject to chemical attack by said binder or mineral having been substantially eliminated.

In witness whereof, I have hereunto set my hand at Indianapolis, Indiana, this 5th day of November, A. D. one thousand nine hundred and thirty-one.

FREDERICK C. ATKINSON